(12) United States Patent
Flott, Jr. et al.

(10) Patent No.: US 7,051,125 B1
(45) Date of Patent: May 23, 2006

(54) SYSTEM AND METHOD FOR MANAGING DATA FLOW IN A CONFERENCE

(75) Inventors: Richard E. Flott, Jr., Austin, TX (US); George D. Wilson, Jr., Austin, TX (US)

(73) Assignee: Polycom, Inc., Milpitas, CA (US)

(*) Notice: Subject to any disclaimer, the term of this patent is extended or adjusted under 35 U.S.C. 154(b) by 532 days.

(21) Appl. No.: 10/366,730

(22) Filed: Feb. 14, 2003

Related U.S. Application Data

(60) Provisional application No. 60/357,439, filed on Feb. 14, 2002.

(51) Int. Cl.
*G06F 3/00* (2006.01)
(52) U.S. Cl. .................... 710/52; 710/29; 709/204
(58) Field of Classification Search ............ 711/117; 710/52, 29; 709/204
See application file for complete search history.

(56) References Cited

U.S. PATENT DOCUMENTS 5,485,211 A * 1/1996 Kuzma ............... 375/240.16
2002/0087761 A1 * 7/2002 Clapp et al. ............... 710/65

* cited by examiner

*Primary Examiner*—Hiep T. Nguyen
(74) *Attorney, Agent, or Firm*—Wong, Cabello, Lutsch, Rutherford & Brucculeri, LLP

(57) ABSTRACT

A system for handling data representative of audio/video information in a conferencing device. The system comprises a set of modules and subsystems for processing the data. The system further comprises at least one channel for transferring processed data between selected ones of the modules and subsystems, the at least one channel having a first buffer list associated therewith. Additionally, a work routine called by the at least one channel is configured to remove a buffer from the first buffer list and to send the buffer to an output routine called by the at least one channel.

51 Claims, 16 Drawing Sheets

SYSTEM AND METHOD FOR MANAGING DATA FLOW IN A CONFERENCE

CROSS-REFERENCES TO RELATED APPLICATIONS

This application claims priority from U.S. Provisional Patent Application No. 60/357,439, filed Feb. 14, 2002 and entitled "System and Method for Managing Data Flow," which is incorporated herein by reference for all purposes.

BACKGROUND OF THE INVENTION

1. Field of the Invention

The present invention relates generally to the field of conferencing, and more particularly to a system and method for managing data flow in a conference.

2. Description of the Background Art

The telecommunications industry is constantly creating alternatives to travel for reaching a meeting forum. Conferencing, such as teleconferencing and videoconferencing, has enabled many users to avoid long and expensive trips merely to meet with others to discuss business related topics and make important decisions. In addition, conferencing often replaces face-to-face meetings involving even the shortest of trips, such as those involving office locations relatively close in distance.

However, prior art attempts at conferencing typically do not manage data flow as efficiently as possible. For example, prior art conferencing systems do not combine buffer management and linking in an object-oriented environment. Therefore, there is a need for an improved system and method for managing data flow in a conferencing system.

SUMMARY OF THE INVENTION

The present invention provides, in various embodiments, a system for handling data representative of audio/video information in a conferencing device. In an exemplary embodiment of the system, the system comprises a set of modules and subsystems for processing the data. The system further comprises at least one channel for transferring processed data between selected ones of the modules and subsystems, the at least one channel having a first buffer list associated therewith. Additionally, a work routine called by the at least one channel is configured to remove a buffer from the first buffer list and to send the buffer to an output routine called by the at least one channel.

A further understanding of the nature and advantages of the present inventions herein may be realized by reference to the remaining portions of the specification and the attached drawings.

DESCRIPTION OF EXEMPLARY EMBODIMENTS

Figure 1A:
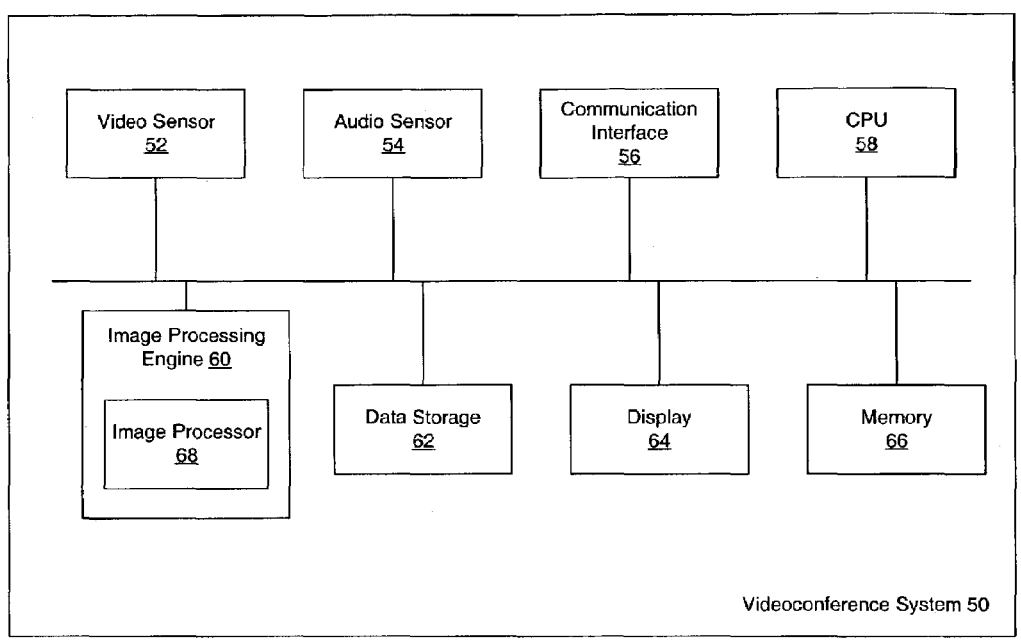
FIG. 1A is a schematic diagram illustrating an exemplary video conferencing system for use with the present invention.

As shown in the exemplary drawings wherein like reference numerals indicate like or corresponding elements among the figures, exemplary embodiments of a system and method according to the present invention will now be described in detail. Detailed descriptions of various embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, method, process, or manner.

As used herein, the term "buffer" may be used to refer to an aggregate of a buffer descriptor and header portion, or simply to a header portion. For example, buffer 910 (FIG. 10) generally refers to a buffer descriptor and header portion, whereas buffer 914 (FIG. 10) generally refers to a header portion.

Referring now to FIGS. 1A, components of an exemplary videoconference system 50 that may function as a local videoconference system is illustrated. The videoconference system 50 comprises at least one video sensor 52, at least one audio sensor 54, a communications interface 56, a central processing unit (CPU) 58, an image processing engine 60, data storage 62, a display 64, and memory 66. The image processing engine 60 further includes an image processor 68. Alternatively, other embodiments of the video conference system 50 may comprise more, fewer, or other devices. Further, although the present invention will be discussed in the context of a videoconference system, the present invention may be employed in an audio conference, data conference, or any other communications environment.

During a videoconference, the videoconference system 50 uses the at least one video sensor 52 (e.g., a video camera) to capture live video images, and uses the at least one audio sensor (e.g., a microphone) to capture audio of local videoconference participants. The captured images are then forwarded to the image processor 68 where the captured images are processed into video signals. Further, the image processor 68 may compress the signals for transmission to remote videoconference systems. Processed video signals may also be sent to the local display 64 for viewing. In an alternative embodiment, the videoconference system 50 may be practiced using recorded images, which would eliminate the need for the video sensor 52.

The processed video image signals along with the audio signals are then forwarded to the communication interfaces 56, which transmits the video and audio signals to a remote videoconference system by way of a communications network. Local videoconference participants can thus communicate both visually and audibly with participants at the remote videoconference system. Because the videoconference system 50 operates bi-directionally, remote participants using a similar videoconference system similar to the videoconference system 50 can likewise transmit video and audio signals to local participants. In this way, meetings between parties who are separated over large distances can take place in real time.

Examples of data storage 62 include random access memory, read only memory, cache memory, hard disks, etc. Furthermore, the data storage 62 is not necessarily located in the videoconference system 50. Alternatively, the data storage 62 can be located on a remote server or a remote computer with the videoconference system 50 accessing data stored on the data storage 62 through a direct or network connection such as a LAN connection.

Figure 1B:
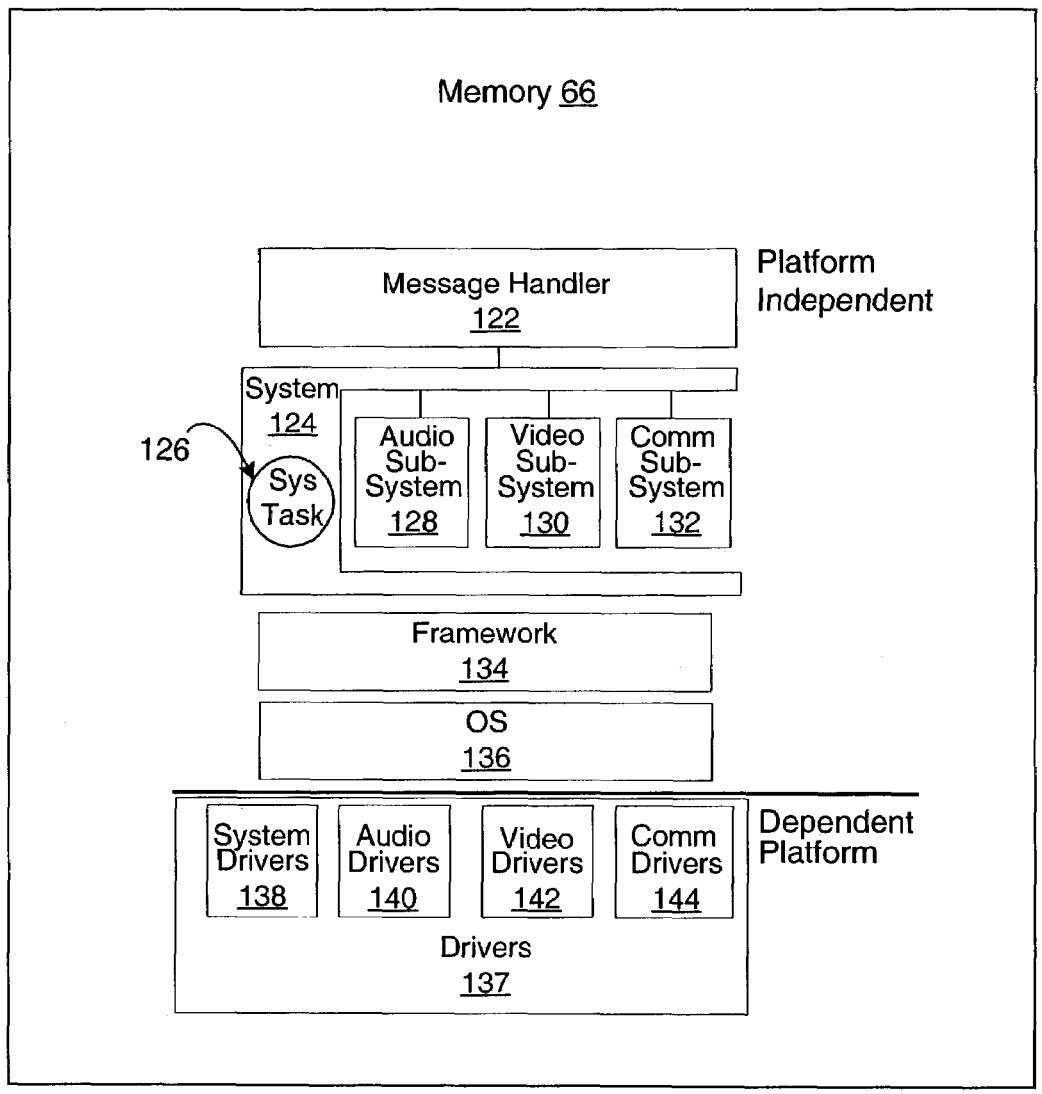
FIG. 1B is a schematic diagram of an architecture in accordance with an embodiment of the present invention.

Referring to FIG. 1B, the memory 66 is shown in greater detail. The memory 66 is for use in an audio/video processing system and comprises, in an exemplary embodiment, a message handler 122, a system module 124 including a system task 126, an audio subsystem 128, a video subsystem 130, a communications subsystem 132, a framework 134, an operating system (OS) 136, and drivers 137. The drivers 137 comprise system drivers 138, audio drivers 140, video drivers 142 and communications drivers 144. The operating system (OS) 136 resides below framework 134 and is a real-time OS. The framework 134 sits between audio/video multimedia code and the OS 136, and is used by the audio/video multimedia code. The audio subsystem 128 comprises channels that are based upon framework 134 channels and facilitate audio encode, audio decode, re-sampling, audio input and output, filtering, etc. Similarly, the video subsystem 130 comprises channels for video in functions, video out functions, video encode functions, video decode functions, compression, scaling, compositing, format conversions, etc. The communications subsystem 132 comprises channels for transport of audio/video on an Internet Protocol (IP) network. The system drivers 138, audio drivers 140, video drivers 142 and communications drivers 144 are platform dependent code that talk to audio/video hardware. The system module 124 starts and stops the subsystems. The system task 126 can be used as a main control task for system and subsystem code and to initialize devices and subsystems. Although shown in a video conferencing system, the architecture can be implemented in a multipoint control unit (MCU), gateway, or other device capable of processing or producing an audio or video signal.

Although FIGS. 2–14 show channels within the framework 134, channels are not limited to residing within the framework 134 (as discussed herein).

Figure 2:
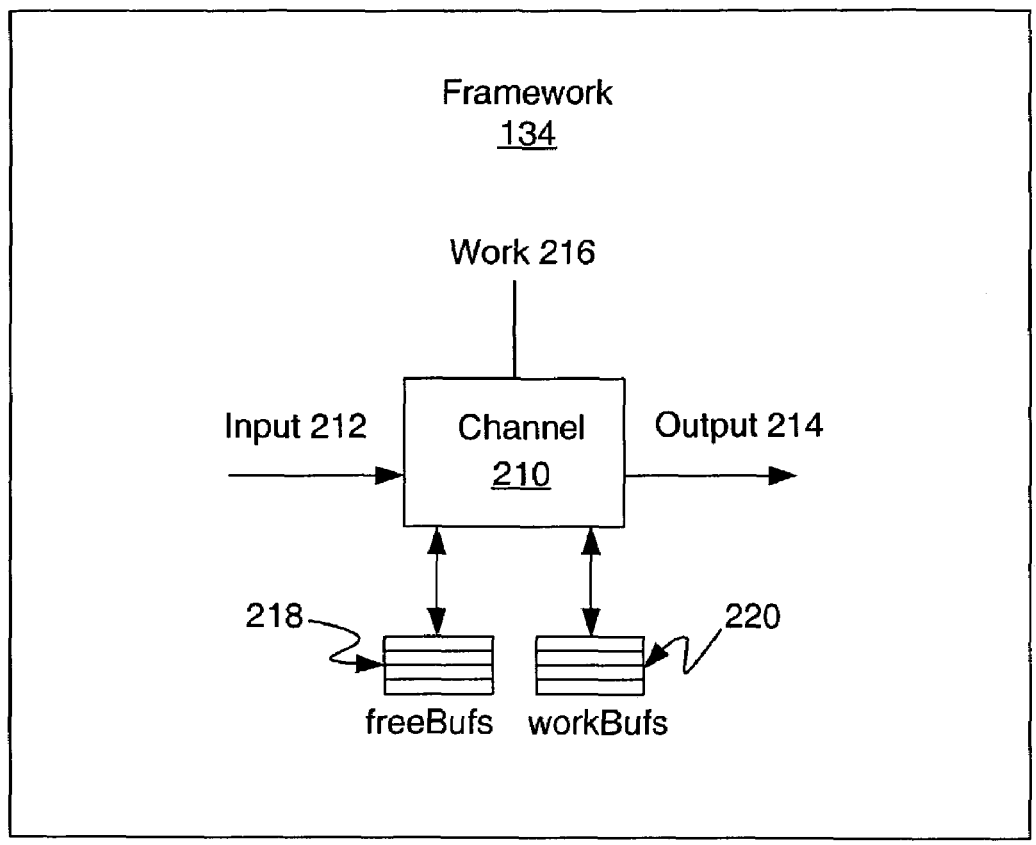
FIG. 2 is a schematic diagram of a channel in accordance with an embodiment of the present invention.

Referring to FIG. 2, at least one channel 210 is implemented in order to facilitate the management of data flow. The channel 210 is used to facilitate data flow between modules and the subsystems (e.g., audio subsystem 128, video subsystem 130, communications subsystem 132 of FIG. 1). Exemplary modules may include audio/video compressors/decompressors, audio resamplers, video scalers, etc. Although only one channel 210 is shown, more channels 210 may be utilized. The channel 210 can reside within the framework 134, the audio subsystem 128, the video subsystem 130, the communications subsystem 132, etc.

The channel 210 performs basic buffer management and data flow operations for real time data. The channel 210 contains very simplistic data flow facilitating code that can be used to build data sources, data sinks, translators, or intermediate data processors or filters. Multiple channels 210 can be linked together to form audio, video, or multimedia style functions. An object-oriented buffer management scheme can thus be combined with the linking of modules together and a state machine (as described herein). Some applications include, but are not limited to, video capture, video display, audio capture, audio rendering, video compressors, video decompressors, etc.

Channel buffers are passed among various channels 210 and possibly between the subsystems using Input routine 212, Output routine 214, and Work routine 216. These routines are indirect function calls. The function calls have default routines so that the channel 210 only needs to define the routine(s) that it needs to use. An Input routine 212 is a function that is called when data is passed to the channel 210 in order to facilitate retrieval of the data. The Work routines 216 are used to process queued-up data at a later time, while the Output routine 214 is function that is called when data is sent out to a different channel 210.

In one embodiment, the channel 210 has a free buffer (freeBufs) list 218 and a work buffer (workBufs) list 220. The free buffer list 218 is used to store buffers that are not yet in use, while the work buffer list 220 is used to store buffers (usually from other channels) that need to be queued up for later processing. By default, both of these linked lists can be empty and are not required to be used.

Further, by default, the Input routine 212 can call the Output routine 214 to send out data, and the Work routine 216 removes any buffers on the workBufs list 220 and sends the buffers to the Output routine 214. Alternatively, a user can override any or all of these routines and can also call the default routines.

In one embodiment according to the present invention, when the first channel 210 is "linked" to a second channel 210, the Output routine 214 of the first channel 210 is set to the address of the second channel so the first channel 210 can call an Input routine of the second channel 210. Input routines 212 and Output routines 214 have channel buffer pointers as parameters to pass data along. It is noteworthy that typically there are multiple Output routines 214 (comprising a linked list). Therefore, the channel's 210 single output can be linked to multiple channel Input routines 214. Data sent out of the channel 210 is passed to one or more (possibly all) coupled Output routines 214. In one embodiment, buffer data is not copied, but rather is duplicated as described herein with respect to, for example, FIG. 12. If the channel 210 should periodically be called, the channel 210 can use its Work routine 216 for the duplication function.

In an exemplary embodiment, the channel 210 comprises two linked-lists. A first linked list is reserved for the channel's 210 free buffers list (freeBufs list 218). A second linked list is reserved for buffers the channel 210 is currently working on (workBufs list 220). However, it is contemplated that the channel 210 can have more or fewer linked lists. When the channel 210 is initialized, the channel 210 specifies how many buffers and of what size the channel 210 should have. When the channel 210 enters an opening state, these buffers (by default) are allocated from memory and added to the freeBufs list 218. The buffers are freed when the channel 210 goes to a closed state. Alternatively, users can override the routines that allocate (alloc) and free buffers. In one embodiment, a data source will define or build (in other words, create) the freeBufs list 218.

The workBufs list 220 is a general usage list for queued-up data. In an exemplary embodiment, an automatic function utilizing the workBufs list 220 comprises the default Work routine 216 sending everything on the workBufs list 220 out when the default Work routine 216 is called. An alternative automatic function comprises freeing all the buffers on the workBufs list 220 to a proper owner when a channel 210 is closed.

It is contemplated that one can link channels together in one embodiment. In order for one to link a first channel 210 to a second channel 210, one can use a ChanAddOutput routine. Subsystem software 128, 130, 132 keeps track of channel linkages. There is typically no limit to the number of channels 210 a channel output can be linked to. Conversely, to break a link, one can use a ChanDeleteOutput routine. Further, a first output of the channel 210 can be determined by implementing a ChanGetFirstOutput routine. According to some embodiments of the present invention, to determine a remainder of the output linkages, a ChanGetNextOutput routine may be utilized.

It is noteworthy that FIG. 2 shows a general data channel 210 in the framework 134. However, specific exemplary channels may be utilized for various functions. The following FIGS. 3–6 will now illustrate exemplary channels in the framework 134 (or subsystems), and the various functions of these channels. In operation, these exemplary channels may be coupled to each other.

Figure 3:
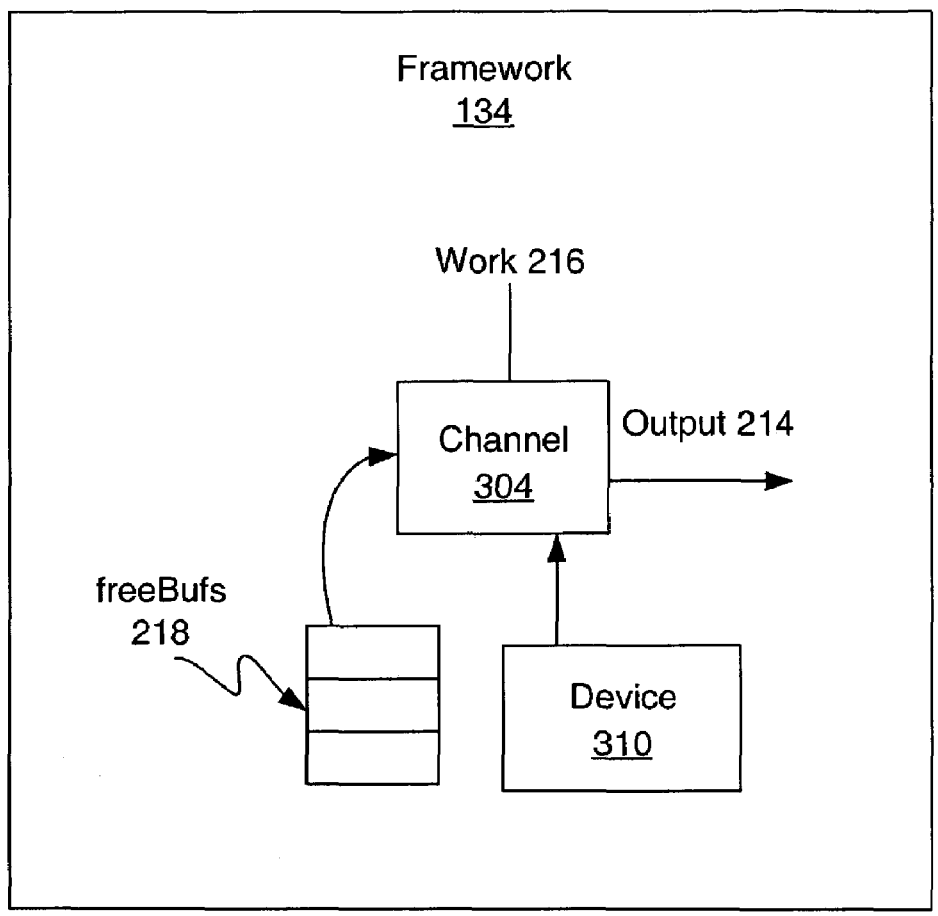
FIG. 3 is a schematic diagram of a data source channel in accordance with an embodiment of the present invention.

Referring now to FIG. 3, in one embodiment, a data source channel 304 uses the default Output routine 214 and not a default Input routine 212 (FIG. 2) to obtain data in any manner the data source channel 304 intended (e.g., reading from a device, etc.). The data source channel 304 allocates a free buffer from the freeBufs list 218, copies the data from a device 310 into the buffer, and then calls the Output routine 214. A data driven channel (not shown) would then execute this code when invoked by an interrupt from the device 310 (channels are typically interrupt safe). A rate driven channel (not shown) utilizes the Work routine 216 (that is invoked every n ms) that executes this same code. It is contemplated that n can be any suitable number.

Figure 4:
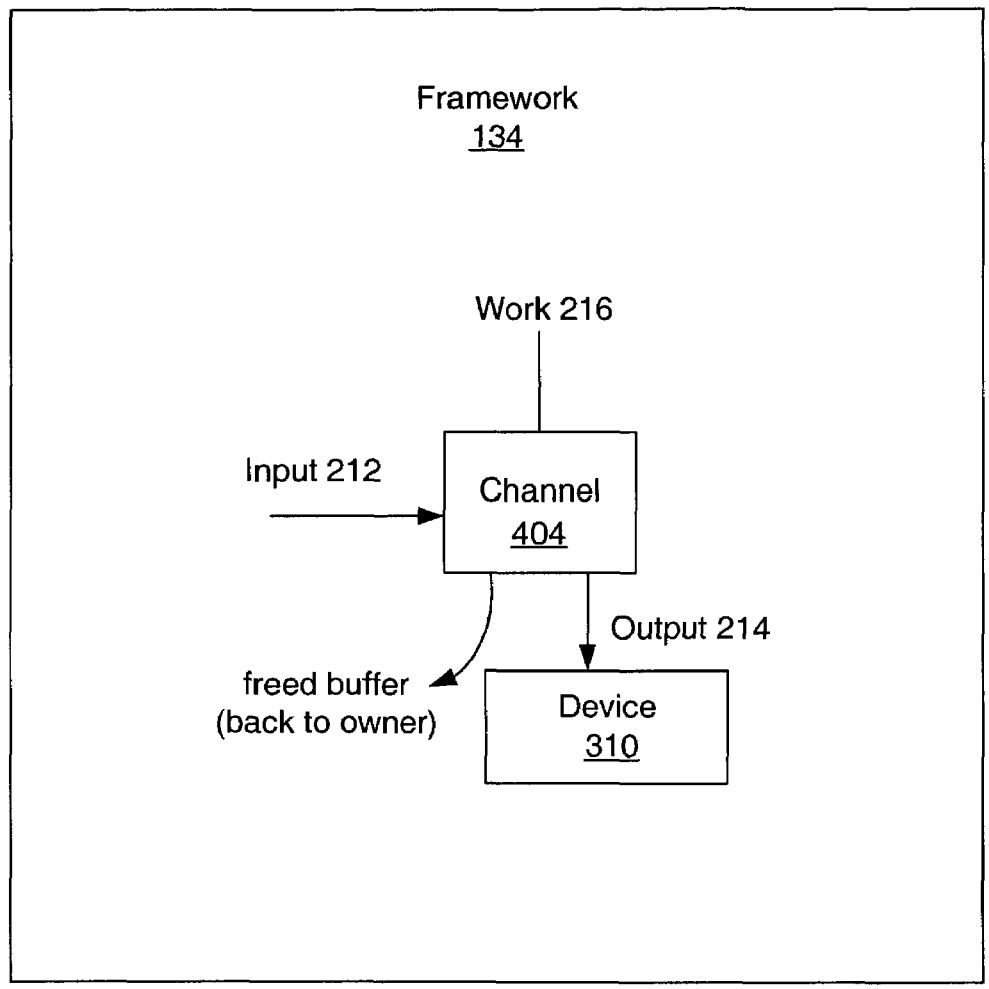
FIG. 4 is a schematic diagram of a data sink channel in accordance with an embodiment of the present invention.

Referring to FIG. 4, an exemplary data sink channel 404 uses the default Input routine 212 and not its default Output routine 214 (these are the same routines as in FIG. 2) to send the data as stated, but instead uses its own Output routine 214 to send its data to the device 310. This Output routine copies the data of the data sink channel 404 from the channel buffer to the device 310 and frees the channel buffer (it goes back to its original owner). A data driven channel (not shown) then executes this code when invoked by the Input routine 212. A rate driven channel (not shown) queues data in its Input routine on the workBufs list 220 (FIG. 2) and overrides the Work routine 216 (that is invoked every n ms) to execute the writing of the data to the device 310 at a given rate.

Figure 5:
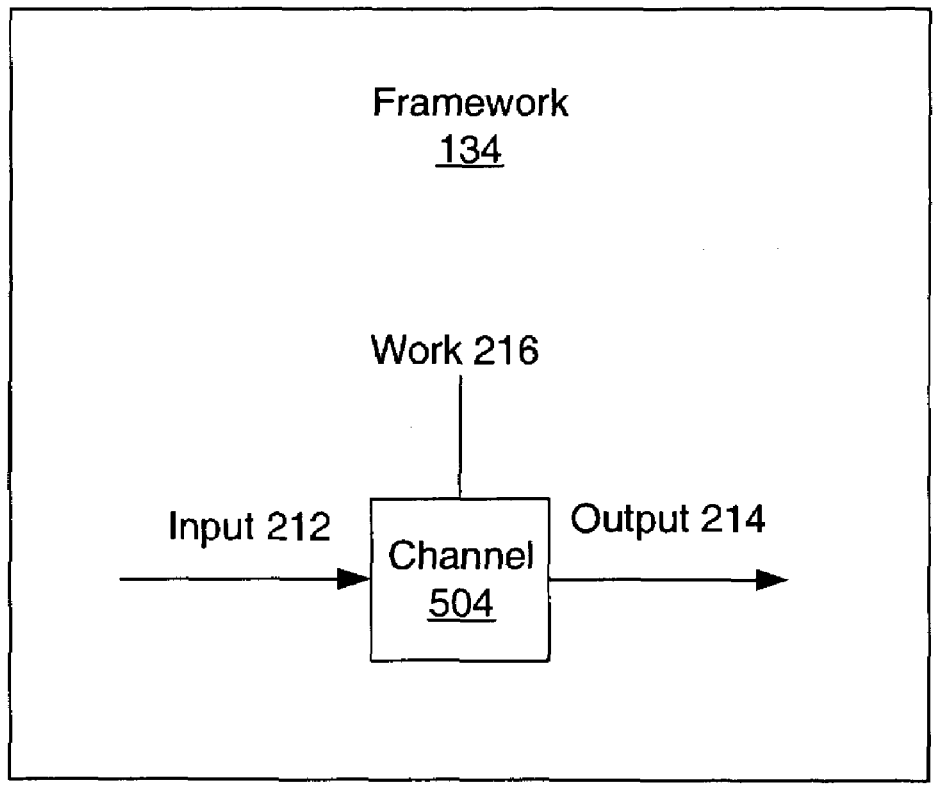
FIG. 5 is a schematic diagram of a data processor/filter channel in accordance with an embodiment of the present invention.

Referring now to FIG. 5, in one embodiment, a data processor/filter channel 504 overrides the default Input routine 212 to process data as needed. The data processor/filter channel 504 calls the default Output routine 214 when the data is completely processed. Again, the data processor/filter channel 504 can be data driven or rate driven.

Figure 6:
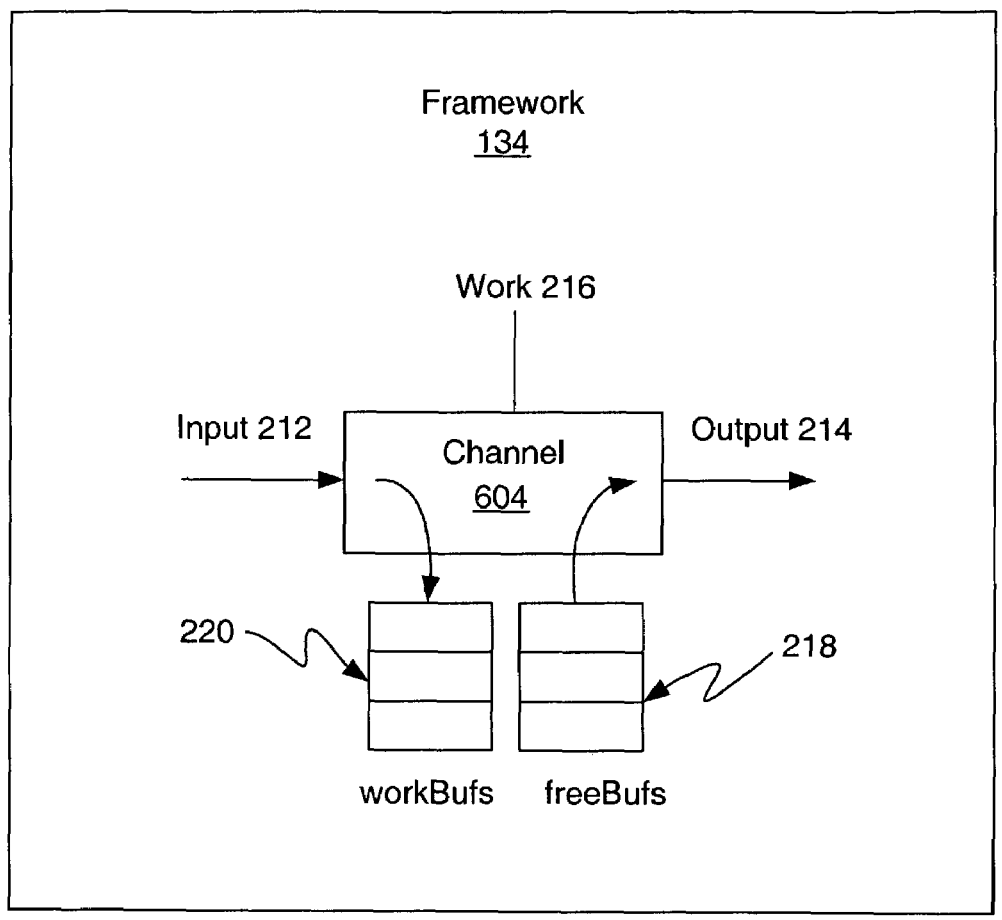
FIG. 6 is a schematic diagram of a data transformer channel in accordance with an embodiment of the present invention.

Referring now to FIG. 6, a data transformer channel 604 is shown. The data transformer channel 604 is basically a back-to-back sink channel and source channel. The data transformer channel 604 uses the default Output routine 214 and overrides the default Input routine 212 to perform a desired data transformation. To transform data, a buffer from the workBufs list 220 is used as input, and a free buffer is allocated from the freeBufs list 218 to be used as an output buffer. A data driven channel (not shown) can execute this code in its Input routine 212. A rate driven channel (not shown) can queue the buffer on the workBufs list 220 in its Input routine 212 and use the Work routine 216 (that is invoked every n ms) to remove the buffer from the workBufs list 220 and execute the same transformation code.

Figure 7:
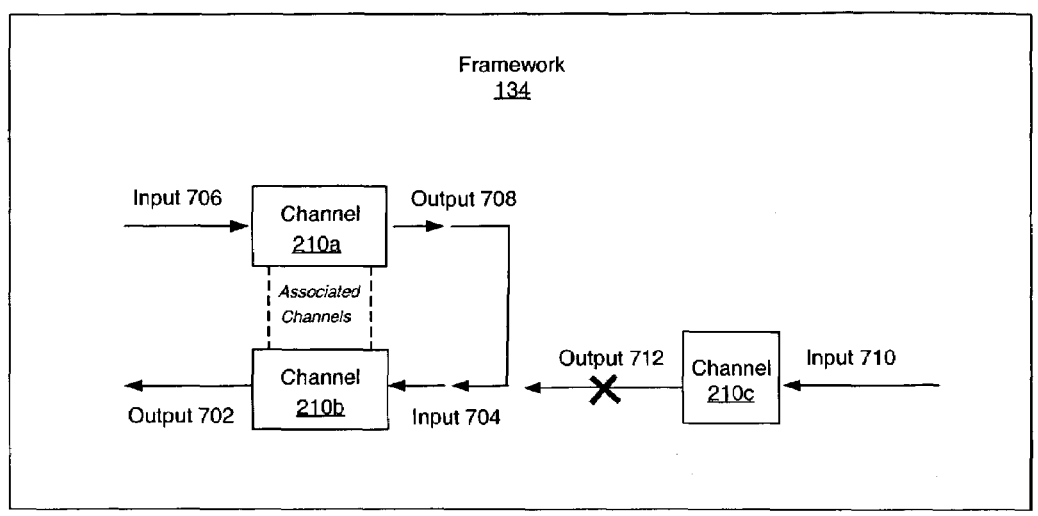
FIG. 7 is a schematic diagram that illustrates a concept of loopbacks in accordance with an embodiment of the present invention.

FIG. 7 is an exemplary diagram of a bidirectional channel. In one embodiment the channels 210 are unidirectional. However, it is contemplated that the channels 210 may be bidirectional. Moreover, the channel 210a can be "associated" with another channel 210b to create a bidirectional pipe (or channel). A bidirectional pipe is a channel that can send data into a channel to be transformed or can receive transformed data from the same channel. A bidirectional pipe can be used for communicating both to and from another channel 210 or device. For example, a video capture channel and a video display channel may be combined together to create a bidirectional channel (or pipe) used to interface to video hardware. The "X" in FIG. 7 signifies a disconnect of data from channel 201c so the channel 201a and channel 201b can loopback their data without getting interference from channel 201c. This type of association allows for very flexible loopbacks. When in loopback mode (a ChanSetLoopback routine is called), an Output routine 702 is linked to an Input routine 704 of its associated channel 210b. In addition, the channel 210a feeding the associated channel 210b is disconnected so that two channels 210a and 210c are not feeding channel 210b.

Figure 8:
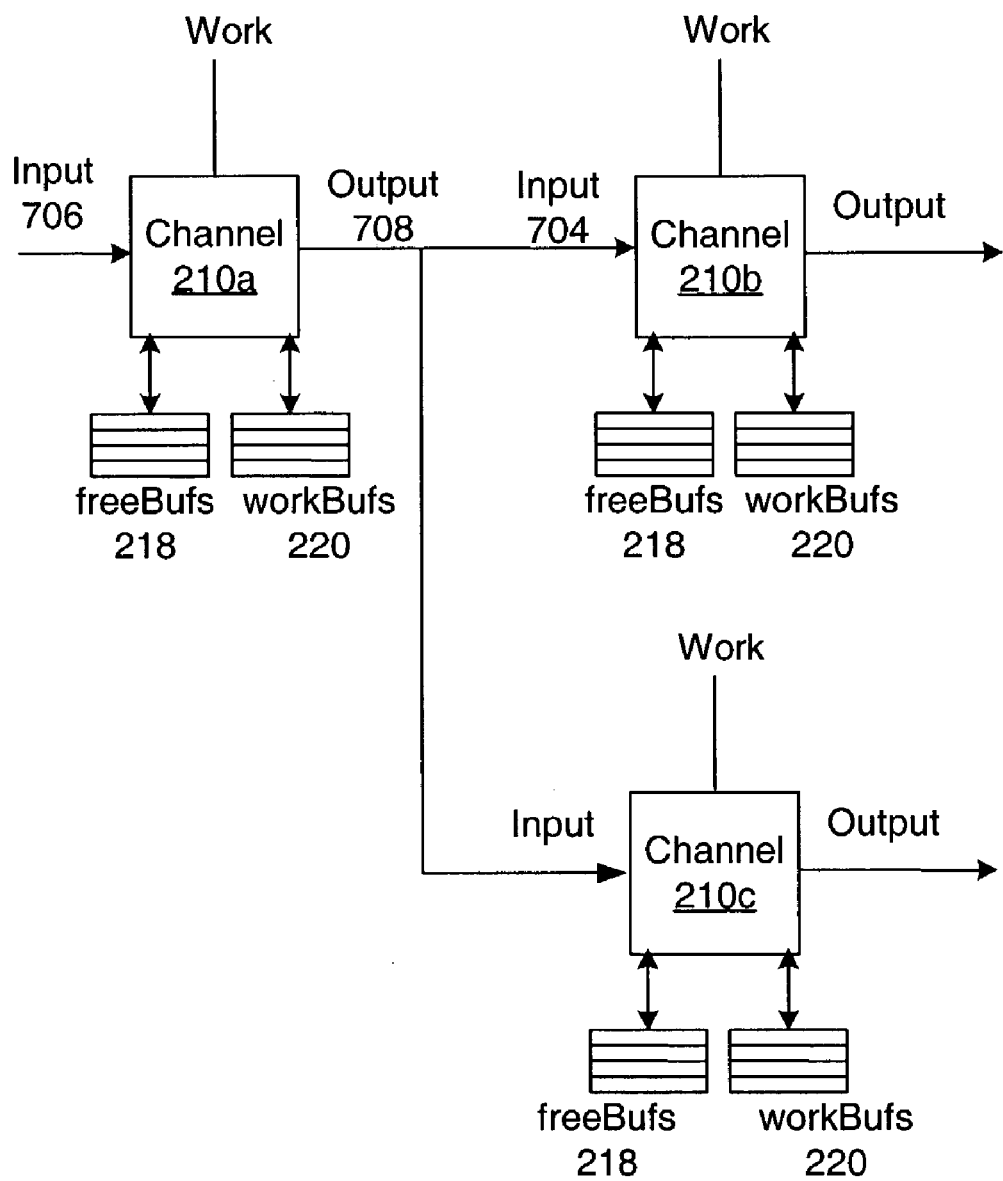
FIG. 8 is a schematic diagram illustrating channel linkage in accordance with an embodiment of the present invention.

FIG. 8 is an exemplary diagram of channels 210 linked. In one embodiment, both the channel Input routines and Output routines can return a value and this value is passed back from a final sink channel 210b in a channel chain to a source channel 210a. Thus, back pressure is created by a data sink channel 210b returning the amount of data it has queued up (in bytes) in its Input routine 704. Backpressure refers to data getting backed-up on an input/output (I/O) interface. The data source channel 210a will get this value returned to it in its Input routine 706 or Output routine 708. The system can then determine what level of backpressure there is and adjust anything it needs to for backpressure (e.g., buffer levels, etc.).

In addition a first channel 210a can query, at any time, the amount of backpressure in a second channel 210b immediately in front of the first channel 210a using the a ChanBacklog routine. If it is desired for the first channel 210a to determine the backpressure on the entire chain in front of it, a ChanTotalBacklog routine can be implemented. The ChanTotalBacklog routine can even follow chains that have duplicated outputs and report back the maximum backpressure from any chain in front of a first channel 210a. This can be accomplished by recursively using the ChanBacklog routine for each separate chain.

Figure 9:
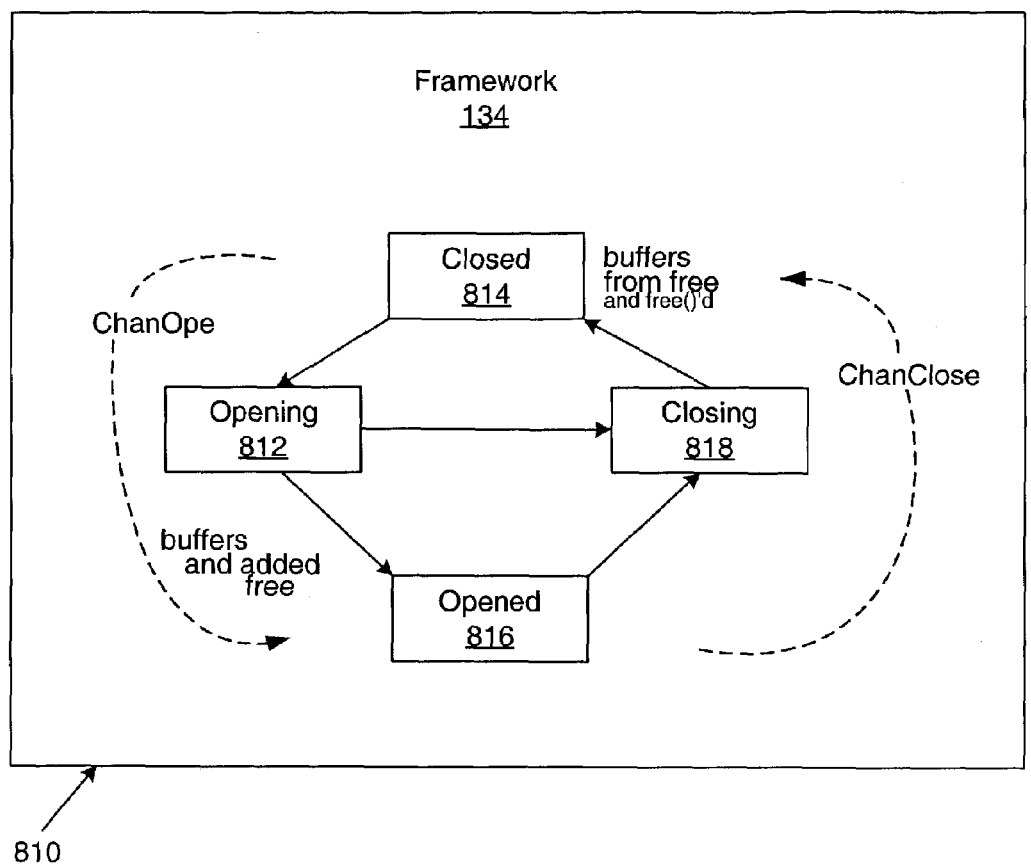
FIG. 9 is a schematic diagram of a four-state state machine in accordance with an embodiment of the present invention.

Referring now to FIG. 9, exemplary channels 210 (FIG. 2) can be represented by a simple four-state state machine 810. A user may add operations to each state of the state machine 810 a SetState routine of a channel 210.

In operation, a ChanOpen routine takes the state machine 810 from the closed state 814 to an opened state 816. Buffers are allocated from memory and added to a freeBufs list 218 (FIG. 6). By default, if the user does not stop the state machine 810, then the state machine 810 will progress all the way to the opened state 816. The state machine 810 can then enter a closing state 818 before closing via a ChanClose routine. Buffers are then removed from the freeBufs list 218 (FIG. 6). A default state routine ensures that the state machine 810 cycles through proper states and is finite (i.e., does not get left in a state indefinitely). In order to add to the state changing operations that occur at each state in the state machine 810, the user can supply their own SetState routine.

Since the channel 210 can carry any kind of information in its buffers, a generic method of specifying the capabilities is defined. The channel 210 can define any structure desired to describe the capabilities of the channel 210 (by overriding a GetCapabilities channel routine). A user of the channel 210 can check the capabilities to be sure that the channel 210 can carry the desired payload.

In one embodiment, there are various features of the channel buffers that are noteworthy. For example, buffers of any length are built out of fixed sized buffer segments that are linked together in a fashion similar to a Unix "mbuf" architecture. Moreover, freeing of a buffer from any channel 210 automatically returns the buffer to a proper pool or owner. Buffers are marked with the channel 210 that allocated them (so that buffer leaks can be tracked down and to allow the buffers to always be returned to the proper pool).

Additionally, data can be added/removed from the front, end, or middle of the buffer, and the buffer can grow or shrink automatically. Further, the buffers can duplicate so that multiple copies of data can go to different destinations without any need to copy the actual data. A reference count is kept so that each channel 210, after the first channel that allocated the buffer, just creates a buffer header. Buffer headers are then freed until the last channel frees the buffer.

Further, scatter or gather code can take multiple data buffer segments and "gather" them into a single contiguous space. Also, a pre-defined link list routine may allow channels 210 to queue buffers on their own link list(s) for future processing.

Figure 10:
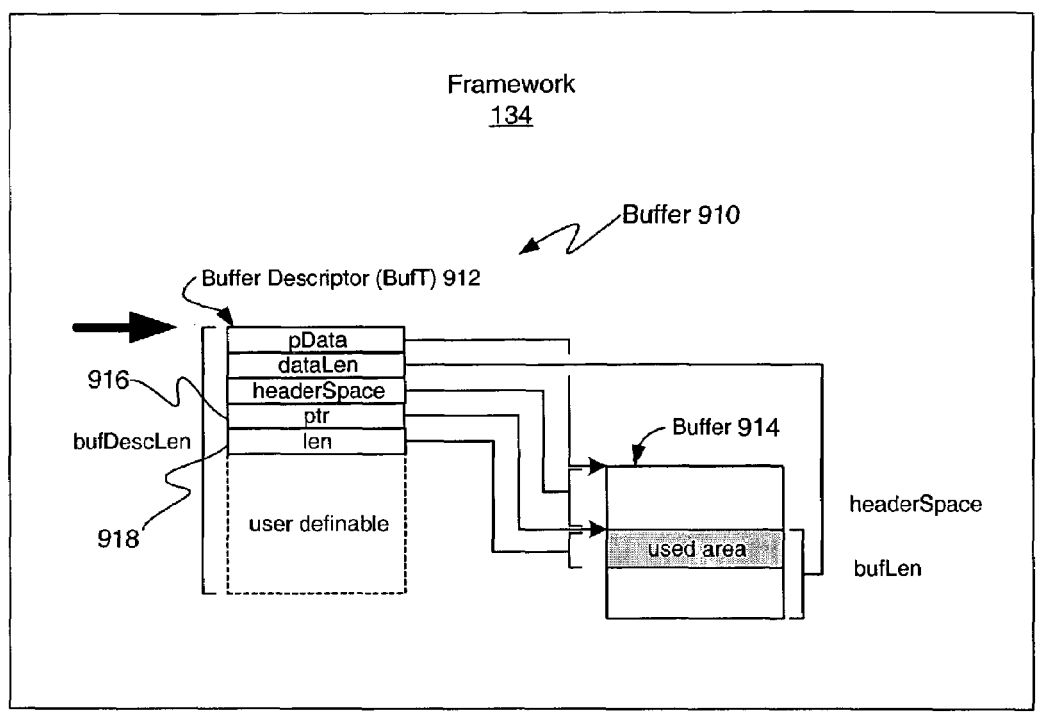
FIG. 10 is a schematic diagram showing two parts of a channel buffer in accordance with an embodiment of the present invention.

Referring to FIG. 10, a channel buffer 910 is shown. The buffer 910 comprises two parts including a buffer descriptor (BufT) 912 and a data portion (Buffer) 914. The buffer descriptor 912 keeps track of the data portion 914 of the channel buffer 910. A pointer to a buffer descriptor 912 is what is passed between channels 210. An area of the buffer 910 that is currently in use is pointed to by a "ptr" field 916 (of the buffer descriptor 912) and is of length "len" 918. Typically, the user modifies these two fields. The other fields are used by the channel routines.

Figure 11:
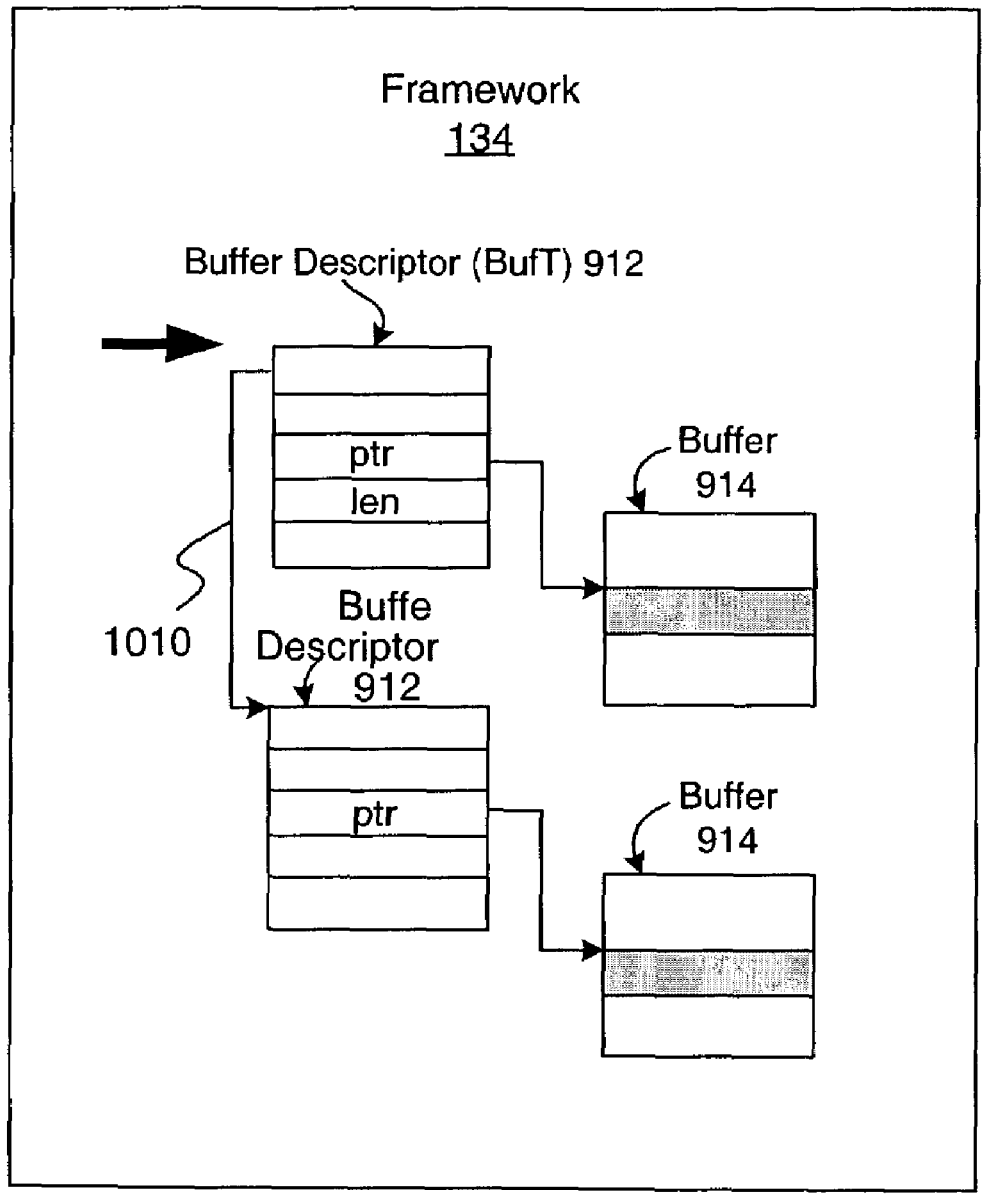
FIG. 11 is a schematic diagram depicting a scattered buffer scenario in accordance with an embodiment of the present invention.

Referring to FIG. 11, a scattered buffers scenario is depicted. It is envisioned that more than one non-contiguous buffer 910 (FIG. 10) can be linked together via pointer 1010 (or by any other suitable means) to form a buffer chain (used in scatter/gather scenarios). Channel routines can read/write across non-contiguous buffer boundaries.

It is contemplated that the channel 210 (FIG. 2) can be initialized without buffers 910 (e.g., by using a ChanInit routine, etc.) or with buffers 910 (e.g., by using a ChanInitWithBufs routine, etc.). When a channel 210 is initialized with buffers 910, various buffer parameters are specified. For example, "numBufs" refers to the number of buffers 914 desired to be in the channel 210 freeBufs list 218 (FIG. 2). "bufLen" refers to the size of each buffer 914, while "bufDescLen" refers to the size of the buffer descriptor 912. Finally, "headerSpace" refers to the amount of header space one desires for the buffer 910.

When the channel 210 then opens, the buffers 914 are allocated automatically (by default a calloc( ) routine) and kept in the channel's free pool (i.e., freeBufs 218). A user may override allocation and de-allocation of memory used for the buffers 914 by overriding BufAllocMem and BufFreeMem routines.

Once the channel 210 is opened and the freeBufs list 218 has been built, the user calls a ChanBufAlloc routine to allocate the channel buffer 910 from the freeBufs list 218, and a ChanBufFree routine to free the channel buffer 910. If the user desires, when the channel buffer 910 is allocated or freed the user can override BufAlloc or BufFree routines and then call default routines (ChanBufAlloc or ChanBufFree routine). It is noteworthy that in order to receive a buffer 914 in the channel 210, one can simply override the Input routine of the channel 210.

In one embodiment, the system includes routines to read and write data to/from buffers 914 both destructively and/or non-destructively. Users can use a BufRead routine to accomplish a non-destructive read from a channel buffer 910 to a user's buffer. A BufWrite routine can be used to overwrite data in a channel buffer 910 from a user's buffer. In one embodiment, this routine will not allow data to be added to the front or end of the buffer 910. One can use a ChanBufExtract routine to read and remove data from the channel buffer 910. To add data to the front/rear of the channel buffer 910, other routines such as ChanBufPrepend or ChanBufAppend routines can be used. These routines can handle buffers 910 that are scattered (more than one buffer 910 is linked together). A ChanFlush routine can be used to flush all buffers 910 on a channel's workBufs list 220 and free the buffers 910 back to the owner.

In an exemplary embodiment, enabling the channel 210 allows its buffers 910 to flow, while disabling the channel 210 stops buffer 910 data flow. This is independent of the channel 210 state and does not force the channel 210 to change state or to allocate for free buffers 910. The disabled channel 210 simply frees any buffer 910 sent to its Input routine 212. Conversely, the enabled channel 210 allows the buffer 910 to flow to the next channel (via Output routine 214). A SetEnable routine can be used to enable/disable the channel 210.

If the system is to pass along extra sideband information with the buffers 910 (e.g., timestamp information, payload format, etc.), then one can implement larger buffer descriptors 912. As long as the beginning portion of the structure passed between the channels 210 is a buffer descriptor 912, anything can be after it.

Figure 12:
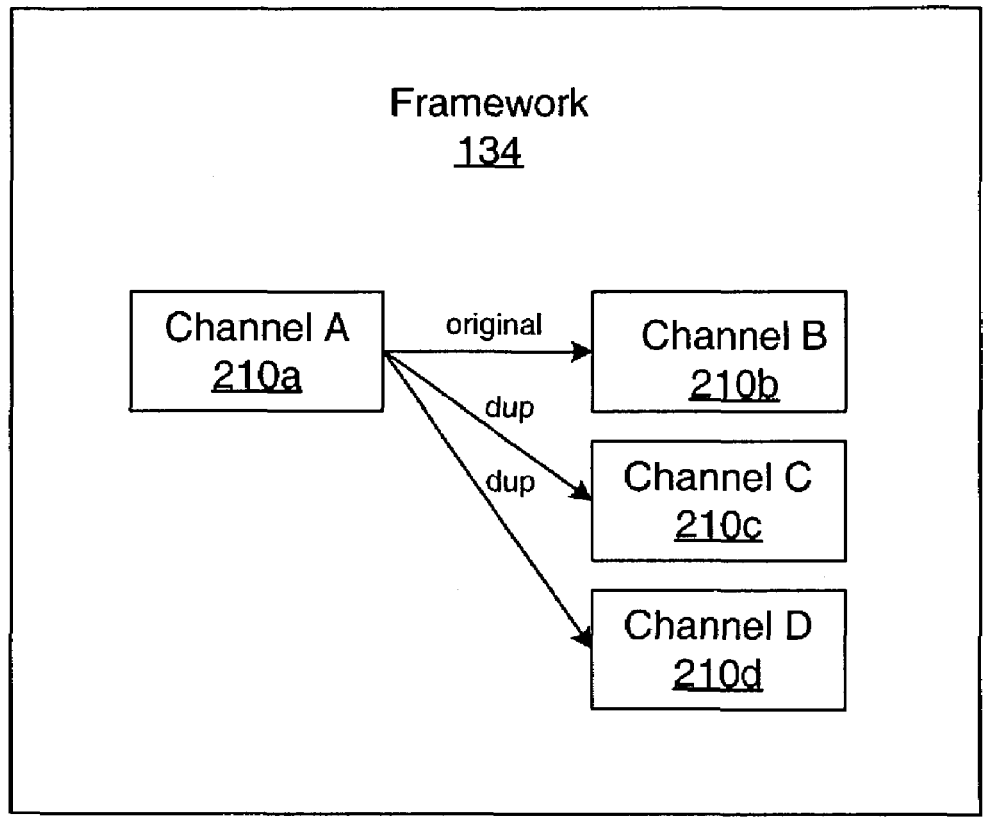
FIG. 12 is a schematic diagram depicting duplication of buffers in accordance with an embodiment of the present invention.

Referring to FIG. 12, if channel A 210a has more than one output linked to it, buffers 910 outputted by channel A 210a are duplicated to corresponding channels (in this case channel C 210c through channel D 210d), and then an original buffer 910 is sent to output channel B 210b. Although FIG. 11 only shows three channels linked to channel A 210a, alternatively any number of channels may be used.

Figure 13:
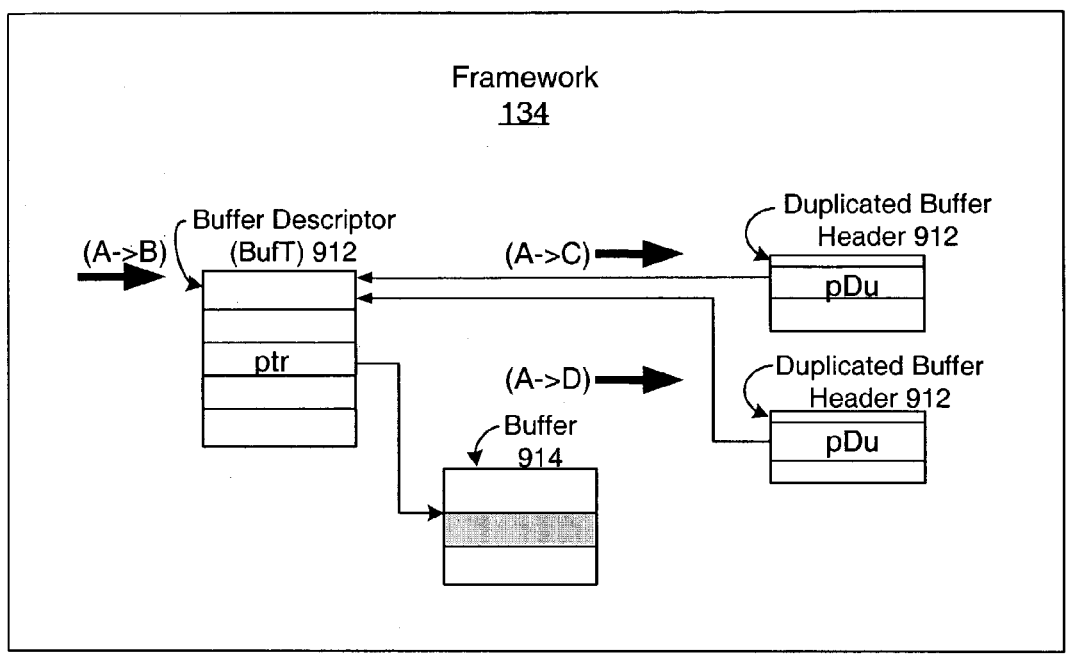
FIG. 13 is an alternative schematic diagram depicting duplication of buffers in accordance with an embodiment of the present invention.

Referring now to FIG. 13, the system accomplishes duplication, in one embodiment, by allocating another buffer descriptor (header) 912 and linking it back to the original buffer descriptor (header) 912. This allows both channels 210 (FIG. 2) to share the same buffer 910 (FIG. 10). In one embodiment, output channels (e.g., B, D or E of FIG. 12) cannot change contents of the buffer 910, but just add data to a front or end of the buffer 910. If it is desired for the system to add data to the front or end of an original buffer 910, the extra data is typically stored in a separate buffer and linked back to the original buffer 910.

In one embodiment, if the user does not want to have buffers 910 (FIG. 10) calloc( )'d from a group of buffers, the user can override a BufAllocMem routine and BufFreeMem routine to allocate and free an actual data portion 914 of the buffer 9–10. This is good for a scenario, for example, where buffers 910 are at fixed hardware addresses, etc.

Figure 14:
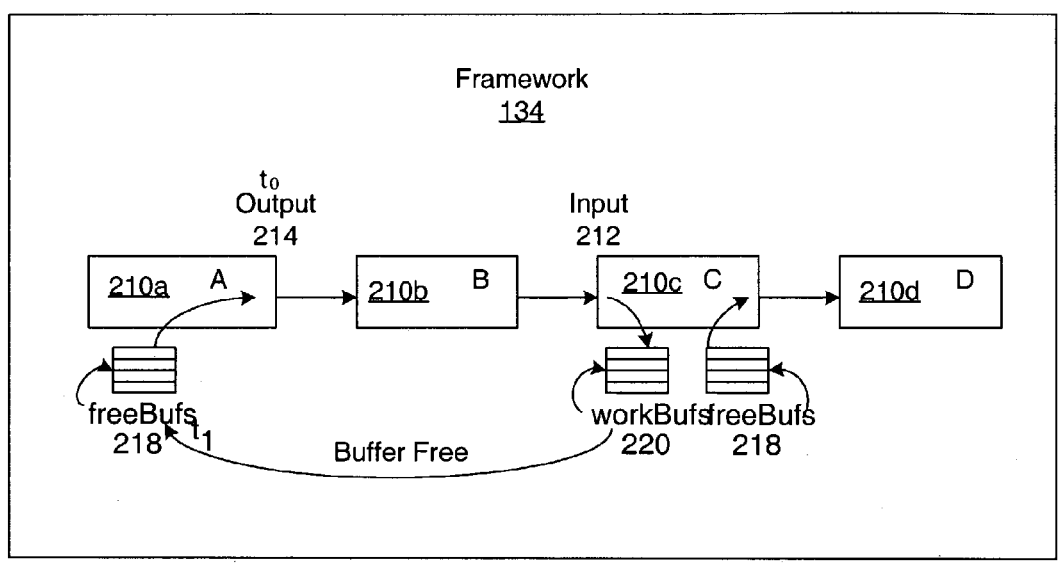
FIG. 14 is a schematic diagram depicting latency calculation in accordance with an embodiment of the present invention.

Referring to FIG. 14, exemplary channels 210 automatically compute latency of the channel(s) 210 in front of them. The system accomplishes these calculations by measuring the time ($t_0$) when a buffer 910 (FIG. 10) leaves the channel 210A (Output routine 214), until a consumer of this buffer 910 returns the buffer 910 back to its freeBufs list 218 (at time $t_1$).

This measurement is accomplished by including a timestamp field in the buffer descriptor 912 (FIG. 13) and storing the current time ($t_0$) in the buffer 910 when the Output routine 214 is called. Since the buffers 910 are typically freed back to their original allocater's freeBufs list 218, the difference in the current time ($t_1$) and the buffer timestamp ($t_0$) is how long the consumer channel 210 keeps this buffer 910 (i.e., the latency). In this example, the latency of channel B 210b and channel C 210c can be measured using this technique.

Additionally, the channel code can also follow an entire chain and add up all of the latencies to provide the total latency of the chain. Results of minimum, maximum and running average latencies can be kept in the channel's stats for future query.

Figure 15:
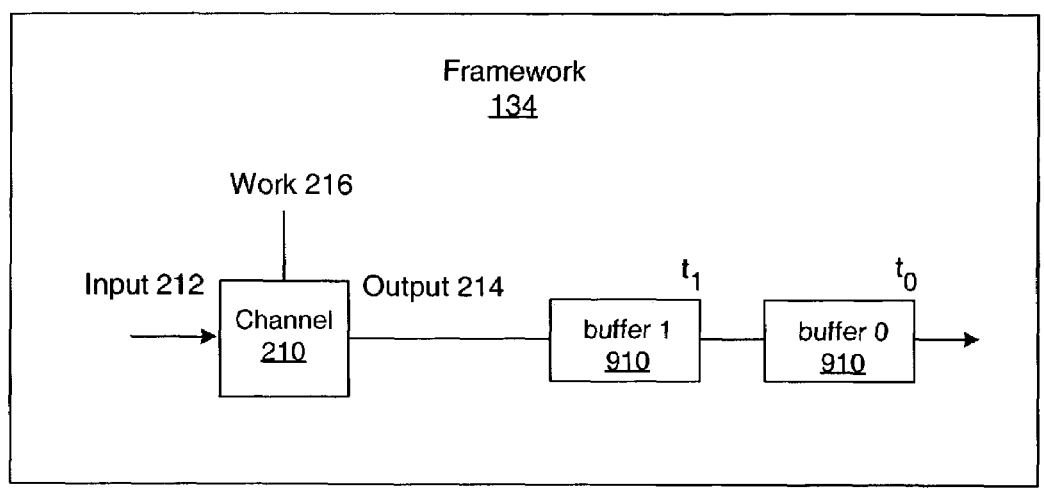
FIG. 15 is a schematic diagram depicting bite rate calculation in accordance with an embodiment of the present invention.

Referring now to FIG. 15, similar to latency, the channels 210 also automatically compute their current bite rate without extra code written by the user. This is done by measuring the time between successive buffers 910 and the amount of data in the buffers 910. In the example above, if buffer 1 comes out 10 ms after buffer 0 and carries 100 bytes of data, then the current bit rate is 100/10 ms=10,000 bytes/s=80 Kbps. This measured bit rate is kept in the channel 210. This is not to be confused with the desired bit rate set in the channel 210. This rate is the actual bit rate as measured by channel code.

It is noteworthy that various routines (e.g., input, output, work, etc.) are stored in the channel 210 itself (hence an object-oriented nature of the channel 210 design). Alternate embodiments of the routines are contemplated by the present invention.

One alternative embodiment is to program a electronic device, such as a computer or a video conference unit, such that it an perform the steps of the methods discussed above in the various embodiments. For example, a machine executable program can perform a method of handling data representative of audio/video information in a conferencing device. The method comprises steps of utilizing a set of modules and subsystems to process me data; transferring, using at least one channel, processed data between selected ones of the modules and subsystems, the at least one channel having a first buffer list associated therewith; and calling a work routine via the at least one channel, the work routine configured to remove a buffer from the first buffer list and to send the buffer to an output routine called by the at least one channel. Any methods discussed above can be implemented in machine executable programs. The machine executable programs may be embodied in any electronically-readable media, such as hard-drives, CD-ROMs, flash memories etc.

The invention has been described above with reference to exemplary embodiments. Many variations of the invention will become apparent to those of skill in the art upon review of this disclosure. For example, although the present system is described in terms of software, those of ordinary skill in the art will recognize that the system can be implemented in hardware, software, or a combination of both hardware and software. Therefore, the scope of the invention should be determined not with reference to the above description, but instead should be construed in view of the full breadth and spirit of the invention as disclosed herein.

What is claimed is:

1. A system for handling data representative of audio/video information in a conferencing device, the system comprising:
    a set of modules and subsystems for processing the data;
    at least one channel for transferring processed data between selected ones of the modules and subsystems, the at least one channel having a first buffer list associated therewith; and
    a work routine called by the at least one channel and configured to remove a buffer from the first buffer list and to send the buffer to an output routine called by the at least one channel.

2. The system of claim 1, wherein the at least one channel may be linked to at least one other channel to effect a desired function.

3. The system of claim 1, wherein the at least one channel can be in an open state or a closed state.

4. The system of claim 3, wherein when the at least one channel is in the open state it passes data and when the channel is in the closed state it does not pass data.

5. The system of claim 1, wherein the at least one channel is for use in an object-oriented system.

6. The system of claim 1, further comprising an input routine called by the at least one channel and configured to provide data to the at least one channel.

7. The system of claim 1, wherein a plurality of channels may be linked together to form a bidirectional pipe and facilitate automatic loopback of data.

8. The system of claim 1, wherein the first buffer list is a work buffer list associated with the at least one channel.

9. The system of claim 1, further comprising a free buffer list associated with the at least one channel.

10. The system of claim 1, wherein concepts of buffer management, data flow order and data flow state are combined in an object-oriented design.

11. The system of claim 1, wherein automatic flow of the data is based upon a data flow state.

12. The system of claim 1, wherein the at least one channel is a code module.

13. The system of claim 1, wherein the at least one channel is an audio communications code module.

14. The system of claim 1, wherein the at least one channel is a video communications code module.

15. The system of claim 1, wherein the at least one channel can be built using a common channel object by way of overrideable functions.

16. The system of claim 1, wherein the at least one channel comprises a data sink.

17. The system of claim 1, wherein the at least one channel comprises a data source.

18. The system of claim 1, wherein the at least one channel comprises a data filter.

19. The system of claim 1, wherein the at least one channel comprises a data transformer.

20. The system of claim 1, wherein the system is configured for automatic data rate measurement.

21. The system of claim 1, wherein the system is configured for automatic data latency measurement.

22. The system of claim 1, wherein the system is configured to automatically duplicate buffers based upon data flow order.

23. The system of claim 1, wherein the system is configured to automatically free buffers based upon buffer ownership.

24. A method of handling data representative of audio/video information in a conferencing device, the method comprising:
utilizing a set of modules and subsystems to process the data;
transferring, using at least one channel, processed data between selected ones of the modules and subsystems, the at least one channel having a first buffer list associated therewith; and
calling a work routine via the at least one channel, the work routine configured to remove a buffer from the first buffer list and to send the buffer to an output routine called by the at least one channel.

25. The method of claim 24, wherein the at least one channel may be linked to at least one other channel to effect a desired function.

26. The method of claim 24, wherein the at least one channel can be in an open state or a closed state.

27. The method of claim 26, wherein when the at least one channel is in the open state it passes data and when the channel is in the closed state it does not pass data.

28. The method of claim 24, wherein the at least one channel is for use in an object-oriented system.

29. The method of claim 24, further comprising calling an input routine by the at least one channel, the input routine configured to provide data to the at least one channel.

30. The method of claim 24, further comprising linking a plurality of channels together to form a bidirectional pipe and facilitating automatic loopback of data.

31. The method of claim 24, wherein the first buffer list is a work buffer list associated with the at least one channel.

32. The method of claim 24, further comprising utilizing a free buffer list associated with the at least one channel.

33. The method of claim 24, wherein concepts of buffer management, data flow order and data flow state are combined in an object-oriented design.

34. The method of claim 24, wherein automatic flow of the data is based upon a data flow state.

35. The method of claim 24, wherein the at least one channel is a code module.

36. The method of claim 24, wherein the at least one channel is an audio communications code module.

37. The method of claim 24, wherein the at least one channel is a video communications code module.

38. The method of claim 24, wherein the at least one channel can be built using a common channel object by way of overrideable functions.

39. The method of claim 24, wherein the at least one channel comprises a data sink.

40. The method of claim 24, wherein the at least one channel comprises a data source.

41. The method of claim 24, wherein the at least one channel comprises a data filter.

42. The method of claim 24, wherein the at least one channel comprises a data transformer.

43. The method of claim 24, further comprising automatically measuring data rate.

44. The method of claim 24, further comprising automatically measuring data latency.

45. The method of claim 24, further comprising automatically duplicating buffers based upon data flow order.

46. The method of claim 1, further comprising automatically freeing buffers based upon buffer ownership.

47. An electronically-readable medium having embodied thereon a program, the program being executable by a machine to perform method of handling data representative of audio/video information in a conferencing device, the method comprising:
utilizing a set of modules and subsystems to process the data;
transferring, using at least one channel, processed data between selected ones of the modules and subsystems, the at least one channel having a first buffer list associated therewith; and
calling a work routine via the at least one channel, the work routine configured to remove a buffer from the first buffer list and to send the buffer to an output routine called by the at least one channel.

48. The electronically-readable medium of claim 47, wherein the at least one channel may be linked to at least one other channel to effect a desired function.

49. The electronically-readable medium of claim 47, further comprising calling an input routine by the at least one channel, the input routine configured to provide data to the at least one channel.

50. The electronically-readable medium of claim 47, further comprising linking a plurality of channels together to form a bidirectional pipe and facilitating automatic loopback of data.

51. A system for handling data representative of audio/video information in a conferencing device, the system comprising:
means for utilizing a set of modules and subsystems to process the data;
means for transferring, using at least one channel, processed data between selected ones of the modules and subsystems, the at least one channel having a first buffer list associated therewith; and
means for calling a work routine via the at least one channel, the work routine configured to remove a buffer from the first buffer list and to send the buffer to an output routine called by the at least one channel.

* * * * *